(12) United States Patent
Jia et al.

(10) Patent No.: US 12,450,230 B1
(45) Date of Patent: Oct. 21, 2025

(54) APPROACHES TO HYBRID LEARNING OF PERSONALIZED RECOMMENDATIONS AND INTERACTIVE DIGITAL HEALTH SYSTEM FOR IMPLEMENTING THE SAME

(71) Applicant: Verily Life Sciences LLC, Mountain View, CA (US)

(72) Inventors: Yugang Jia, Winchester, MA (US); Sina Rashidian, Boston, MA (US)

(73) Assignee: Verily Life Sciences LLC, Dallas, TX (US)

( * ) Notice: Subject to any disclaimer, the term of this patent is extended or adjusted under 35 U.S.C. 154(b) by 0 days.

(21) Appl. No.: 18/400,330

(22) Filed: Dec. 29, 2023

Related U.S. Application Data

(60) Provisional application No. 63/478,041, filed on Dec. 30, 2022.

(51) Int. Cl.
*G06F 16/2453* (2019.01)
*G06F 16/2457* (2019.01)

(52) U.S. Cl.
CPC .. *G06F 16/24534* (2019.01); *G06F 16/24578* (2019.01)

(58) Field of Classification Search
CPC ......... G06F 16/24534; G06F 16/24578; G06F 16/93; G16H 10/60; G16H 20/10; G16H 50/20; G16H 50/70; G16H 70/40
See application file for complete search history.

(56) References Cited

U.S. PATENT DOCUMENTS

| | | | |
|---|---|---|---|
| 10,380,259 B2 | 8/2019 | Lee et al. | |
| 10,963,782 B2 | 3/2021 | Xiong et al. | |
| 11,355,240 B2 | 6/2022 | Hirsch et al. | |
| 2015/0324433 A1* | 11/2015 | Duffy | G06F 16/22 707/722 |
| 2016/0357855 A1 | 12/2016 | Fan et al. | |
| 2019/0198179 A1* | 6/2019 | Dey | G16H 10/60 |
| 2023/0169276 A1* | 6/2023 | Cook | G06F 40/30 706/11 |
| 2023/0214432 A1* | 7/2023 | Tunkelang | G06N 5/01 707/722 |
| 2023/0367969 A1* | 11/2023 | Chaturvedi | G10L 15/1815 |

* cited by examiner

*Primary Examiner* — Hau H Hoang
(74) *Attorney, Agent, or Firm* — Perkins Coie LLP

(57) ABSTRACT

Introduced here is an interactive digital health system (or simply "interactive system") that is able to update a knowledge base used to facilitate semi-automated conversations to account for feedback. The interactive system can include a collection of modules that, in operation, can provide or support coaching services in the digital health domain, Upon receiving input indicative of a question from a patient, these modules allow the interactive system to perform language modeling to identify content objects in a knowledge base that are relevant to the question. Moreover, the interactive system may update the knowledge base to account for feedback, thereby making the knowledge base more robust to a broad range of questions.

22 Claims, 7 Drawing Sheets

500

501
Acquire first input that is indicative of a query from a patient

502
Provide the query to a machine learning model, so as to produce an embedding that numerically represents the query in a language domain

503
Provide entries in a knowledge base to the machine learning model, so as to produce embeddings that numerically represent the entries in the language domain

504
Compare the embedding produced for the query against the embeddings produced for the entries in the knowledge base

505
Identify multiple embeddings from among the embeddings produced for the entries in the knowledge base that most closely correspond to the embedding produced for the query

506
Cause display of multiple content cards that are associated with the multiple embeddings identified as the most similar to the embedding produced for the query

507
Acquire second input that is indicative of a selection of a content card from among the multiple content cards by a coach

508
Add a new content card that programmatically associates the query with content included in the selected content card to the knowledge base

FIGURE 5

APPROACHES TO HYBRID LEARNING OF PERSONALIZED RECOMMENDATIONS AND INTERACTIVE DIGITAL HEALTH SYSTEM FOR IMPLEMENTING THE SAME

CROSS-REFERENCE TO RELATED APPLICATIONS

This application claims priority to U.S. Provisional Application No. 63/478,041, titled "Approaches to Hybrid Learning of Personalized Recommendations and Interactive Digital Health System for Implementing the Same" and filed on Dec. 30, 2022, which is incorporated herein by reference in its entirety.

TECHNICAL FIELD

Various embodiments concern computer programs and associated computer-implemented techniques for learning how to customize the presentation and consumption content in the context of digital health.

BACKGROUND

Coaching is a form of development in which one individual—commonly called a "coach"—supports another individual—commonly called a "client"—in achieving a goal by providing training, guidance, and the like. Coaching normally focuses on events in a predetermined arrangement to provide the training that incrementally leads the client through objectives to achieve the goal. The arrangement of events constitutes a "coaching strategy" or simply "strategy" for achieving the goal in a more predictable manner. Strategies can be applied or assigned to clients based on their desired goals. Conforming to a rigid strategy can—and often does—result in failure in achieving the goal, as clients have different preferences, abilities, strengths, and weaknesses.

Consider, for example, an individual with diabetes who is interested in better managing her health. A healthcare professional (e.g., a doctor) may prescribe a disease management program to augment or address the individual's malfunctioning physiology. At a high level, the disease management program may be representative of an attempt at disease management through behavioral therapy. The healthcare professional may consider numerous factors such that the disease management program is formulated in a personalized manner. For example, the blood glucose metrics (e.g., average range, average level, average time-in-range), adverse effects of insulin, cost (e.g., based on insurance coverage), likelihood of adherence, and quality of life may be considered by the healthcare professional when choosing or designing the disease management program for the individual.

Over time, the health of the individual may change. Changes may be due to natural progression of diabetes, or changes may be due to mismanagement, for example, due to lack of adherence to the tedious and burdensome processes required by the disease management program. As such, the individual may risk experiencing diabetes-related complications despite being prescribed a disease management program.

Such a scenario is illustrative of the benefits of coaching. With a coach, the individual may be able to more easily adhere to the disease management program, and therefore manage her diabetes. Coaching can take various forms, from ongoing interactions (e.g., through a mobile application executing on a mobile phone) to periodic conversations. However, the individual may still fail if the coach does not construct or adopt an appropriate strategy for the individual.

BRIEF DESCRIPTION OF THE DRAWINGS

FIG. 5 includes a flow diagram of a process for personalizing a knowledge base that is used to facilitate conversations.

Figure 1:
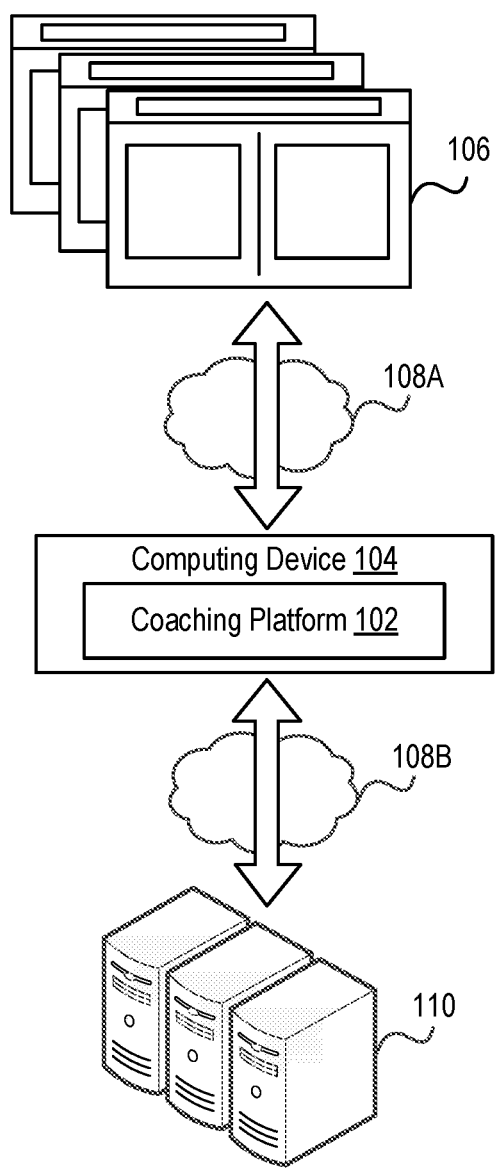
FIG. 1 illustrates a network environment that includes a coaching platform that is executed by a computing device.

Various features of the technology will become more apparent to those skilled in the art from a study of the Detailed Description in conjunction with the drawings. In the drawings, embodiments are illustrated by way of example and not limitation for the purpose of illustration. Those skilled in the art will recognize that alternative embodiments may be employed without departing from the principles of the present disclosure. Accordingly, while specific embodiments are shown in the drawings, the technology is amenable to various modifications.

DETAILED DESCRIPTION

In the context of digital health, coaching has traditionally involved a coach guiding one or more clients (also called "members," "users," or "patients" in some circumstances) through educational content as part of a disease management program. Over the last several years, coaching has increasingly taken place via electronic mediums, and therefore the education content may be presented to the patients via respective computing devices. Some coaches separately engage with the patients to provide a greater sense of personalization. However, the educational content itself is typically not personalized for the patients.

Generally, the disease management program is not tailored to its participants—namely, the patients—in a personalized manner. Coaching may be reactive such that it occurs when a given patient (a) experiences a medical event or (b) matches a predetermined criteria (e.g., a predetermined number of incomplete activities or unmet benchmarks). However, the educational content of the disease management program tends to be tailored for a shared characteristic of the patients, such as disease classification, gender, age, etc. As an example, the education content may be created, selected, or compiled based on a determination that all of the patients have diabetes. Because the educational content is not tailored in a personalized manner, it is highly likely that most, if not all, of the patients will be presented educational content that is not relevant. This can lead to less engagement by the patients, that in turn can lead to poorer adherence to the disease management program.

There have been several attempts to address this problem. Human-driven solutions suffer from high costs, in addition to issues with scalability and latency. Manually personalizing disease management programs is a tedious task that is still prone to errors. Meanwhile, entirely automated solutions tend to expose significant gaps in the underlying knowledge base. For example, computer programs designed to simulate conversation—also called "chatbots"-often fail to answer all questions posed by patients, which has a negative impact on their experiences. Furthermore, entirely automated solutions require constant maintenance of, and updates to, the underlying knowledge base. Without this maintenance, chatbots can quickly become outdated—either due to lack of appropriate responsiveness or lack of proper responses. Accordingly, there is a need for a hybrid solution that is scalable, reliable, and intelligent enough to learn from interactions between coaches and patients.

Overview of Interactive Digital Health System

Introduced here is an interactive digital health system (or simply "interactive system") that is able to produce content flows (or simply "flows") for patients in a personalized manner. As further discussed below, the interactive system can address the drawbacks of traditional approaches by implementing a coaching service that adepts variable content objects in a content flow (or simply "flow") based on the needs of each patient. Each flow may involve successive presentation of content objects in a manner similar to the successive presentation of playing cards during a card game, and as such, the content objects may be referred to as "content cards." Further, a flow of content objects may be referred to as a "deck" of content cards.

In the field of digital health, fully- or semi-automated coaching services rely on knowledge bases that contain predefined documentation for responding to questions posed by patients and conveying guidance to improve health. For the interactive system, this predefined documentation is segmented into content objects that can be structured to have titles, tags, categories, subcategories, descriptions, and the like. For the purpose of illustration, examples of content objects are provided below; the present disclosure is not intended to be limited to content objects having these structures, however. Those skilled in the art will recognize that the interactive system can utilize the same processes in the event that this predefined documentation has a different structure.

The interactive system can include a collection of modules that, in operation, can provide or support coaching services in the digital health domain, Upon receiving input indicative of a question from a patient, these modules—which are discussed in greater detail below—allow the interactive system to (i) perform language modeling to identify content objects that are relevant to the question and (ii) order the content objects based on a personal characteristic of the patient, such that the content object deemed to be most appropriate for the patient can be presented for review. For example, the content objects may be ordered based on the patient's health or interests, engagement with the interactive system, success in managing her disease, etc.

While the content of content objects can vary (e.g., from static text to audio and video), content objects are generally designed or constructed with the same goal—improve the underlying health of a patient. Accordingly, content objects will often include recommendations (e.g., "eat A rather than B," "walk for 15 minutes today," etc.), but content objects could also include educational summaries, motivational statements, and the like. For the purpose of illustration, embodiments may be described in the context of providing recommendations; however, those skilled in the art will recognize that content objects can vary.

In operation, these modules can determine how a flow of content objects should be adapted for a given patient. At a high level, these modules effect a coaching service that adapts the flow to account for the needs of the given patient. Personalized flows go well beyond simulating personal coaching, as even personal coaching tends to lack personalization on a per-patient basis.

As mentioned above, chatbots have been employed in the context of digital health before. Generally, these conventional chatbots are only able to answer a limited number of questions, lack of personalization, and need the underlying knowledge base to be constantly expanded. The inability to actively learn new content limits the usefulness of these conventional chatbots, especially since the healthcare domain covers a wide gamut of issues.

Without large amounts of reliable data, designing and evaluating the aforementioned modules is difficult. Accordingly, in contrast to conventional chatbots, the interactive system may create or obtain a robust dataset from which to learn questions, answers, and question-answer pairings. For example, the interactive system may have access to hundreds of thousands or millions of messages between coaches and patients. Not only does this amount of data provide a significant advance in learning how to personalize flows of content objects for patients, but it also means that a large range of questions will be included (and therefore, answerable by the interactive system).

Embodiments may be described in the context of computer-executable instructions for the purpose of illustration. However, aspects of the technology could be implemented in hardware or firmware instead of, or in addition to, software. As an example, a set of algorithms representative of the aforementioned modules may be executed by a coaching platform. The coaching platform could be embodied as a software program—which is executable by or accessible to the interactive system—that offers support for tracking adherence to disease management programs, reviewing feedback from coaches, and permitting communication between patients and coaches.

Terminology

References in the present disclosure to "an embodiment" or "some embodiments" means that the feature, function, structure, or characteristic being described is included in at least one embodiment. Occurrences of such phrases do not necessarily refer to the same embodiment, nor do they necessarily refer to alternative embodiments that are mutually exclusive of one another.

The terms "comprise" and "comprising" are to be construed in an inclusive sense rather than an exclusive or exhaustive sense (i.e., in the sense of "including but not limited to").

The term "based on" is also to be construed in an inclusive sense rather than an exclusive or exhaustive sense. Thus, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively connected to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may utilize multiple modules that are responsible for completing different tasks, or a computer program may utilize a single module that is responsible for completing multiple tasks.

When used in reference to a list of items, the word "or" is intended to cover all of the following interpretations: any of the items in the list, all of the items in the list, and any combination of items in the list.

The term "content object" refers to a data structure that includes or references text, digital images, audio, video, or other media content. As further discussed below, content objects can be structured to include titles, tags, categories, subcategories, descriptions, and the like. Meanwhile, the term "content card" may refer to a content object that is formatted for consumption by a target audience. Content cards can be designed to educate a target audience in accordance with an objective of a strategy. The target audience could be a coach that is responsible for conveying information included in, or derived from, the content card to a patient, or the target audience could be the patient. The format of a given content card may be based on its target audience. Note that, for simplicity, the terms "content object" and "content card" are largely interchangeable with one another.

The term "coach" may be used to refer to an individual that supports another individual in achieving a goal by providing training, guidance, motivation, and the like. While a healthcare professional, such as a doctor or nurse, could be a coach, it is not required that coaches be healthcare professionals. Coaches are often individuals who can provide advice and resources about topics such as nutrition, exercise, and disease management.

Overview of Coaching Platform

FIG. 1 illustrates a network environment 100 that includes a coaching platform 102 that is executed by a computing device 104. An individual (also referred to a "user") can interact with the coaching platform 102 via interfaces 106. For example, a patient may be able to access an interface through which information feedback from a coach can be reviewed. As another example, a coach may be able to access an interface through which feedback can be provided to one or more patients. Depending on the nature of the individual accessing the interfaces 106, the interfaces 106 may allow for the review of physiological data, examination of outputs produced by the coaching platform 102, communication with other users (e.g., between a coach and patient, multiple coaches, or multiple patients), and management of preferences.

Some interfaces may be configured to facilitate interactions between patients and coaches, while other interfaces may be configured to serve as informative dashboards for patients or coaches. Accordingly, data that is obtained by the coaching platform 102 could be associated with the individual accessing the interfaces 106 or some other person. For example, the interfaces 106 may enable a patient diagnosed with a disease to view her own physiological data. As another example, the interfaces 106 may enable a coach to view physiological data associated with a patient. Interfaces 106 that are designed to be accessible to, and usable by, patients may be parts of a device-implemented patient console (also called a "member console" or "subject console"), while interfaces 106 that are designed to be accessible to, and usable by, coaches may be parts of a device-implemented coach console. The device-implemented patient and coach consoles may each be called a "user console," as patients and coaches may be users of the coaching platform 102.

As shown in FIG. 1, the coaching platform 102 can reside in a network environment 100. Thus, the computing device 104 on which the coaching platform 102 resides can be connected to one or more networks 108A-B. Depending on its nature, the computing device 104 could be connected to a personal area network ("PAN"), local area network ("LAN"), wide area network ("WAN"), metropolitan area network ("MAN"), or cellular network. For example, if the computing device 104 is a computer server, then the computing device 104 may be accessible to users via respective mobile phones that are connected to the Internet via LANs. Data to be examined by the coaching platform 102 may be generated by the respective mobile phones or acquired by the respective mobile phones.

Additionally or alternatively, the computing device 104 may be connected to one or more other computing devices over a short-range wireless connectivity technology, such as Bluetooth®, Near Field Communication ("NFC"), Wi-Fi® Direct (also referred to as "Wi-Fi P2P"), and the like. As an example, the coaching platform 102 could be embodied as a mobile application that is executed by a mobile phone. In such embodiments, the mobile phone may be communicative connected—via a wireless communication channel—to a source from which to acquire data. The source could be a watch, fitness tracker, or another wearable computing device, for example. The data could alternatively be obtained from another computer program executing on the mobile phone. For example, the data could instead be acquired from another mobile application executing on the mobile phone or the operating system of the mobile phone.

The interfaces 106 may be accessible via a web browser, desktop application, mobile application, or another form of computer program. For example, a patient may be able to access interfaces through which information regarding her own health is viewable via a mobile application executing on a mobile phone. As another example, a coach may be able to access interfaces through which information regarding one or more patients can be reviewed via a web browser. Accordingly, the interfaces 106 generated by the coaching platform 102 may be accessible on various computing devices, including mobile phones, tablet computers, desktop computers, and the like.

Generally, the coaching platform 102 is executed—at least partially—by a cloud computing service operated by, for example, Amazon Web Services®, Google Cloud Platform™, or Microsoft Azure®. Thus, the computing device 104 may be representative of a computer server that is part of a server system 110. Often, the server system 110 is comprised of multiple computer servers. These computer servers can include different types of data (e.g., physiological data and information regarding patients, such as name, demographic information, disease classification, etc.), algorithms for processing incoming data, messages between coaches and patients, and other assets. Those skilled in the art will recognize that these data could also be distributed among the server system 110 and one or more computing devices. As an example, some data that is input by, or related to, patients may be stored on, and processed by, their own computing devices for security or privacy purposes.

Components of the coaching platform 102 could also be hosted locally. That is, part of the coaching platform 102 may reside on the computing device used to access one of the interfaces 106. For example, the coaching platform 102 may be embodied as a mobile application executing on a mobile phone as mentioned above. Note, however, that the mobile application may be communicatively connected to the server system 110 on which other components of the coaching platform 102 are hosted.

Figure 2:
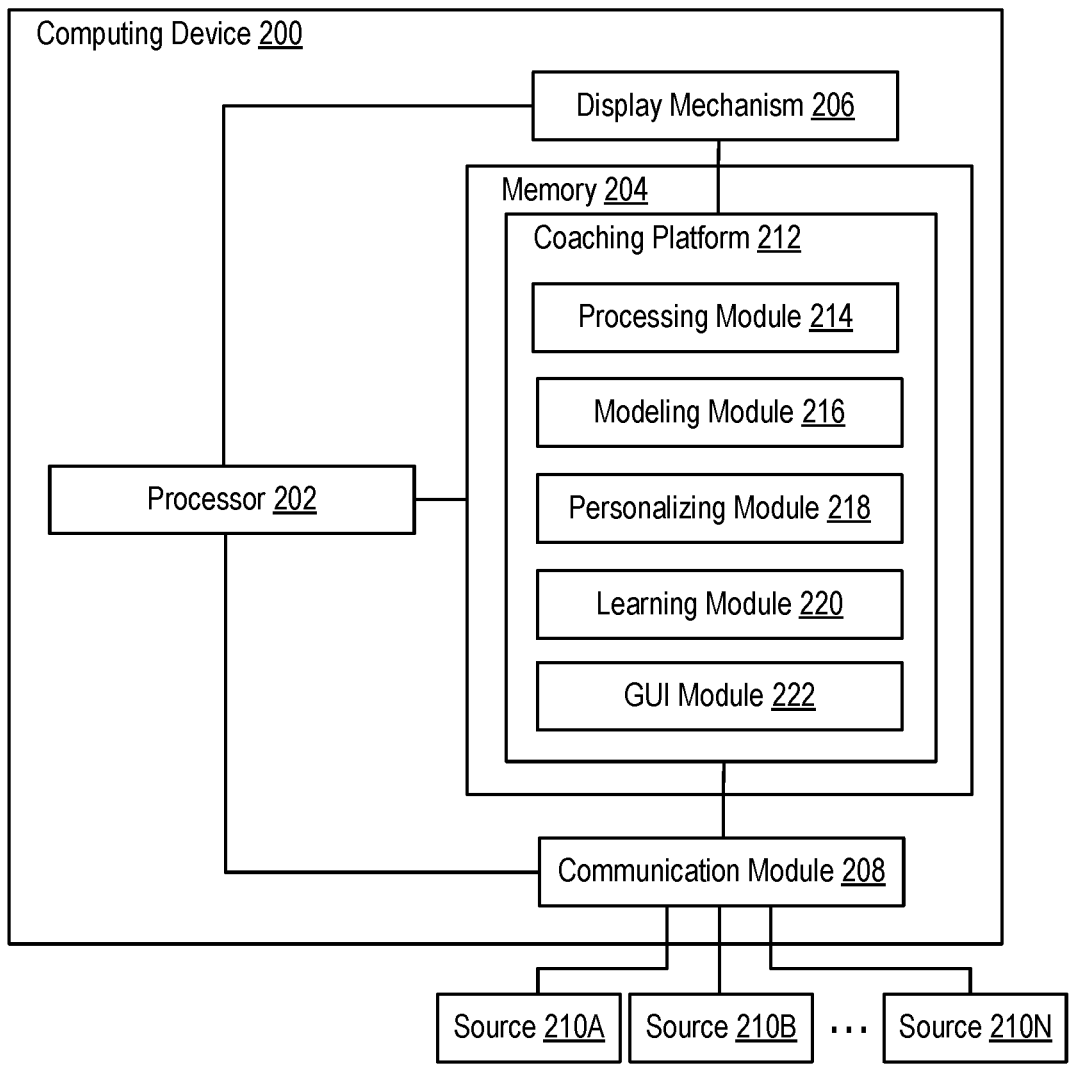
FIG. 2 illustrates an example of a computing device that is able to implement a coaching platform designed to implement a coaching service that varies the content objects used to guide different patients toward a healthier state.

FIG. 2 illustrates an example of a computing device 200 that is able to implement a coaching platform 212 designed to implement a coaching service that varies the content objects used to guide different patients toward a healthier state. As shown in FIG. 2, the computing device 200 can include a processor 202, memory 204, display mechanism 206, and communication module 208. Each of these components is discussed in greater detail below.

Those skilled in the art will recognize that different combinations of these components may be present depending on the nature of the computing device 200. For example, if the computing device 200 is a computer server that is part of a server system (e.g., server system 110 of FIG. 1), then the computing device 200 may not include the display mechanism 206. Conversely, if the computing device 200 is a mobile phone, then the computing device 200 can include the display mechanism 206.

The processor 202 can generic characteristics similar to general-purpose processors, or the processor 202 may be an application-specific integrated circuit ("ASIC") that provides control functions to the computing device 200. As shown in FIG. 2, the processor 202 can be coupled to all components of the computing device 200, either directly or indirectly, for communication purposes.

The memory 204 can be comprised of any suitable type of storage medium, such as static random-access memory ("SRAM"), dynamic random-access memory ("DRAM"), electrically erasable programmable read-only memory ("EEPROM"), flash memory, or registers. In addition to storing instructions that can be executed by the processor 202, the memory 204 can also store data generated by the processor 202 (e.g., when executing the modules of the coaching platform 212). Note that the memory 204 is merely an abstract representation of a storage environment. The memory 204 could be comprised of actual integrated circuits (also called "chips").

The display mechanism 206 can be any mechanism that is operable to visually convey information to a user. For example, the display mechanism 206 can be a panel that includes light-emitting diodes ("LEDs"), organic LEDs, liquid crystal elements, or electrophoretic elements. As further discussed below, outputs produced by the coaching module 212 (e.g., through execution of its modules) can be posted to the display mechanism 206 for review by a user of the computing device 200. As mentioned above, the user could be a coach or patient.

The communication module 208 may be responsible for managing communications external to the computing device 200. The communication module 208 can be wireless communication circuitry that is able to establish wireless communication channels with other computing devices. Examples of wireless communication circuitry include 2.4 gigahertz ("GHz") and 5 GHz chipsets compatible with Institute of Electrical and Electronics Engineers ("IEEE") 802.11—also referred to as "Wi-Fi chipsets." Alternatively, the communication module 208 may be representative of a chipset configured for Bluetooth, NFC, and the like. Some computing devices—like mobile phones, tablet computers, and the like—are able to wirelessly communicate via separate channels, while other computing devices—like watches and fitness trackers—tend to wirelessly communicate via a single channel. Accordingly, the communication module 208 may be one of multiple communication modules implemented in the computing device 200, or the communication module 208 may be the only communication module implemented in the computing device 200.

The nature, number, and type of communication channels established by the computing device 200—and more specifically, the communication module 208—can depend on (i) the sources from which data is received by the coaching platform 212 and (ii) the destinations to which data is transmitted by the coaching platform 212. Assume, for example, that the coaching platform 212 resides on a server. In such embodiments, the communication module 208 can communicate with sources 210A-N external to the computing device 200 from which to obtain data. Moreover, the communication module 208 may communicate with one or more mobile devices to which analyses of the data—or the data itself—are transmitted.

For convenience, the coaching platform 212 is referred to as a computer program that resides within the memory 204. However, the coaching platform 212 could be comprised of software, firmware, or hardware that is implemented in, or accessible to, the computing device 200. In accordance with embodiments described herein, the coaching platform 212 can include a processing module 214, modeling module 216, personalizing module 218, learning module 220, and graphical user interface ("GUI") module 222. These modules could be integral parts of the coaching platform 212, or these modules could be logically separate from the coaching platform 212 but operate "alongside" it. Together, these modules enable the coaching platform 212 to personalize the flows of content cards identified for patients.

The processing module 214 can process data that is obtained by the coaching platform 212 into a format that is suitable for the other modules. For example, the processing module 214 can apply operations to data acquired from the sources 210A-N in preparation for analysis by the other modules of the coaching platform 212. For example, the processing module 214 can filter or alter the data, such that the data can be more readily analyzed. As another example, the processing module 214 may parse messages between coaches and patients and then temporally arrange the messages into threads, thereby clustering related messages together. Such an approach may be helpful in learning how to construct knowledge bases for responding to questions in an automated manner.

Knowledge bases can be constructed based on an analysis of messages that have been exchanged between coaches and patients. For example, the processing module 214 may have access to hundreds of thousands or millions of messages, and using these messages, the processing module 214 can construct one or more knowledge bases. Each knowledge base may be designed to facilitate conversation related to a corresponding disease. For example, the processing module 214 may construct a first knowledge base that can be used to respond to a patient with diabetes in an automated manner, and the processing module 214 may construct a second knowledge base that can be used to respond to a patient with heart disease. Knowledge bases could be constructed for various chronic diseases, including diabetes, heart disease, cancer, stroke, arthritis, and the like. It can be helpful to create a separate knowledge base for each disease, as similar terminology may be used across different diseases despite having different meanings or implications.

While constructing the knowledge bases may allow for greater insight into the exchanges between coaches and patients, the coaching platform 212 could acquire or access the knowledge bases rather than construct them on its own. Accordingly, in some embodiments the knowledge bases are maintained in the memory 204, while in other embodiments the knowledge bases are maintained in memory external to the computing device 200, in which case the knowledge bases may be accessible via the communication module 208.

In the event that the coaching platform 212 receives input that is indicative of a query from a user, the modeling module 216 may be responsible for establishing the meaning of the query. The modeling module 216 may use machine learning models called "language models" to understand the query and information available in any knowledge bases that are accessible to the coaching platform 212. Specifically, the modeling module 216 may take advantage of sentence embeddings that are based on Bidirectional Encoder Representations from Transformers ("BERT") transformer models (also called "BERT transformers") and numerically represent corresponding inputs in a language domain. BERT transformers are generally developed through BERT-influenced training of Transformer, a popular attention model, to language modeling. Further information regarding Transformer was provided by Ashish Vaswani et al. in "Attention Is All You Need," 31*st conference on Neural Information Processing Systems* (*NIPS*), 2017. At a high level, Transformer includes two mechanisms, namely, an encoder that reads the text provided as input and a decoder that produces a prediction for the task. As opposed to directional language models that read the input text sequentially (i.e., left-to-right or right-to-left), the Transformer encoder reads the entire input text at once. While Transformer is commonly described as bidirectional, its approach to analysis may be more accurately described as non-directional. This characteristic allows the context of a word to be learned based on all of its surroundings (e.g., to the left and right of the word).

When training a language model, defining the prediction goal can be a challenge. Many language models are designed to predict the next word in a sequence—a directional approach that inherently limits contextual learning. To overcome this challenge, BERT uses two training strategies, namely, masked language modeling ("MLM") and next sentence predicting ("NSP"). As part of the MLM training strategy, a subset of the words in each sequence used for training are replaced with a "mask" token and then the language model attempts to predict the original value of each masked word, based on the context provided by the non-masked words in the sequence. As part of the NSP training strategy, the language model is provided pairs of sentences such that the language model learns to predict whether the second sentence in each pair is subsequent to the first sentence in each pair. During training, the MLM and NSP training strategies can be employed together, with the goal of minimizing the combined loss function of those strategies.

In operation, the modeling module 216 can convert each sentence included in the query into an m-dimensional vector in hyperspace. With this approach, words that have more similar meaning semantically will have closer distances. For example, embeddings for the terms "sushi" and "pizza" will have less distance between them than embeddings for the terms "pizza" and "pants." This gives the modeling module 216 the ability to understand the semantics of individual words and whole sentences, which greatly surpasses more traditional approaches that rely on searching for keywords discovered in a query in a knowledge base. Whereas humans generally need to search the knowledge base multiple times with different keywords and combinations of keywords to find an appropriate answer in the knowledge base, the modeling module 216 can identify the appropriate answer much more efficiently.

Assume, for example, that T represents a set of all content card titles $T=(t_1, \ldots, t_n)$ and dummy titles DT. Note that the dummy titles DT may initially be the same as the content card titles T. Note that the purpose of the dummy titles DT is discussed in greater detail below with reference to the learning module 220. First, the modeling module 216 can convert each entry in set T into a vector using sentence embeddings. This set of vectors may be referred to as C=sentence_embedding(DT). Set C may have n vectors, and each vector may have m dimensions. Therefore, $C=(c_1, \ldots, c_n)$ and each $c_i=[c_i^1, \ldots, c_i^m]$.

The modeling module 216 can then measure the distance between the m-dimensional vector produced for the query to the m-dimensional vectors produced for the content card titles. The lower the difference between a pair of m-dimensional vectors, the more similar the meaning from a semantic perspective. There are several ways to measure similarity between a pair of m-dimensional vectors. For example, the modeling module 216 may use Euclidean distance as a measure of similarity between two vectors, as shown below:

$$d(q,c_i) = \sqrt{\Sigma_{j=1}^{m}(q^j - c_i^j)^2} \qquad \text{Eq. 1}$$

where q=sentence_embedding(query).

The modeling module 216 can populate the distance measures into a data structure D and then sort the distance measures from lowest (i.e., most semantic similarity) to highest (i.e., least semantic similarity). The data structure D may be columnar array, for example, with n entries, each of which includes the distance measure computed for a corresponding one of the n vectors in set C. With the data structure D, the modeling module 216 can identify content card titles that are semantically similar to the query. In some embodiments, the number of content card titles that are identified by the modeling module 216 is predetermined. For example, the modeling module 216 may identify the two, three, five, or ten content card titles having the smallest distance measures. In other embodiments, the number of content card titles that are identified by the modeling module 216 is dynamically determined. For example, the modeling module 216 may identify all content card titles for which the distance measure is beneath a predetermined threshold. For each identified content card title, the modeling module 216 can identify the corresponding content card using the index from the set T.

Given the relatively small number of content card titles identified by the modeling module 216, the personalizing module 218 may be responsible for selecting an appropriate content card for the user that submitted the query. At a high level, personalization may involve reordering the content card titles based on one or more characteristics of the user. Examples of characteristics include personal history (e.g., whether the user has historically adhered to a prescribed disease management program), medical history (e.g., disease, disease classification, disease progression), interests, and the like.

For example, the personalizing module 218 may adjust the distance measures—or compute new weighted measures based on the distance measures—based on feedback provided by the user. Users may be permitted to like or dislike content cards, for example, through a review process carried out through interfaces generated by the coaching platform 212. For each content card $c_i$, the personalizing module 218 can establish two features, namely, $like_i$ and $dislike_i$, that represent the number of times that a set of users have liked and disliked the content. The set of users could be representative of all of the patients that are enrolled with the coaching service provided by the coaching platform 212, or the set of users could be representative of a subset of the patients that are enrolled with the coaching service provided by the coaching platform 212. With the two features, the personalizing module can compute an adjusted first weight $w_i^1$ for each identified content card as follows:

$$w_i^1 = like_i + 1/like_i + dislike_i + 2.\qquad\text{Eq. 2}$$

Here, the adjusted first weight $w_i^1$ is equal to 0.5 when there are no likes or dislikes. If the number of likes is more than half of the total number of likes and dislikes, the adjusted first weight $w_i^1$ will be greater than 0.5. However, if the number of likes is less than half of the total number of likes and dislikes, the adjusted first weight $w_i^1$ will be less than 0.5. Those skilled in the art will recognize that Eq. 2 could easily be adjusted so that the adjusted first weight $w_i^1$ is equal to some number other than 0.5 when there are either no likes or dislikes or the same number of likes and dislikes.

Another aspect of personalization may be avoiding repetitive content cards. However, there may be some scenarios where users search for content cards that were previously identified and liked, so the personalizing module 218 may not implement an absolute rule (i.e., where each content card is only ever surfaced once for each user). Instead, the personalizing module 218 may compute an adjusted second weight $w_i^2$ for each identified content card. If, for example, $t_i$ represents the number of days since the last time that content card $c_i$ was identified for the user that submitted the query, the adjusted second weight $w_i^2$ can be computed as follows:

$$w_i^2 = \{0\, t_i<1\, 1\le t_i\le 30\, 1 t_i\}\qquad\text{Eq. 3}$$

In the event that the personalizing module 218 implements Eq. 3, if the content card $c_i$ is sent within the last 30 days, then the adjusted second weight $w_i^2$ will be less than one. Combining (e.g., multiplying) an adjusted second weight $w_i^2$ that is less than one and a distance measure computed for an identified content card will result in the recommendation strength of the identified content card being lessened. Again, those skilled in the art will recognize that Eq. 3 could easily be tuned so that recently shown content cards are penalized for more time (e.g., where $w_i^2=t_i$ if $t_i\le 45, 60, 75$, etc.) or less time (e.g., where $w_i^2=t_i$ if $t_i\le 10, 15, 20$, etc.).

Additionally or alternatively, the personalizing module 218 may emphasize diversifying the content cards identified by the modeling module 216. This can be accomplished by selecting or filtering the content cards identified by the modeling module 216 via analysis of related information. As discussed above, the modeling module 216 may identify the content cards based on semantic similarity between the titles and the query submitted by the user. To ensure the identified content cards are sufficiently diverse, the personalizing module 218 may review the categories or subcategories of the identified content cards. For example, the personalizing module 218 may filter the identified content cards—which may be representative of the top k findings by the modeling module 216—so that each belongs to a different subcategory and no more than a predetermined number (e.g., 2, 3, or 5) belong to the same category. Examples of categories include monitoring, nutrition, medication, engagement, risk reduction, and the like. Meanwhile, subcategories may depend on the corresponding category. For example, for the nutrition category, examples of subcategories include reduced sodium, weight loss planning, heart healthy-low cholesterol meal planning, mindful eating, etc. As another example, for the medication category, examples of subcategories include daily medications, emergency medications, weight loss medications, cholesterol medications, improved regimen adherence, delayed or inconsistent administration, etc.

In some embodiments, the personalizing module 218 may employ advanced recommendation models, heuristics, or rules to further tailor the identified content cards for each user. As an example, an advanced recommendation model may utilize other users' experiences with content-based recommendation systems and/or collaborative filtering recommendation systems. With a collaborative filtering recommendation system, appropriate content cards for a given user can be identified based on the behavior of similar users, whereas with a content-based recommendation system, features of the knowledge base can affect decisions made regarding which content cards are appropriate. Successfully employing advanced recommendation models, heuristics, or rules requires access to large amounts of data, however. Accordingly, having access to hundreds of thousands or millions of messages between coaches and patients may be critical to achieving success.

Using the outputs of Eqs. 1, 2, and 3, the personalizing module 218 can adjust the distance measures for the content cards identified by the modeling module 216. Assume, for example, that the personalizing module 218 is interested in identifying the top five content cards for the user that submitted the query. In such a scenario, the personalizing module 218 can calculated the adjusted distance measures as follows:

$$s_i = w_i^1 \times w_i^2 / d_i \qquad\text{Eq. 4}$$

$$S = \{s_1, \ldots, s_n\} \qquad\text{Eq. 5}$$

$$R = top(sorted(S), k), k=5 \qquad\text{Eq.6}$$

Here, R is representative of the set of content cards while k is the number of content cards. Generally, k is between 2 and 10 (and preferably, between 2 and 5).

In some embodiments, the coaching platform 212 is designed to actively learn over time as content cards are identified for users and feedback regarding those identified content cards. Specifically, the learning module 220 may be responsible for incorporating or implementing a feedback loop that makes it possible to categorize future queries more accurately (and allows an independent, automated messaging system to be built more consistently and quickly). Each time that a user selects an answer other than the ones recommended by the personalizing module 218, the input query and selected answer—collectively called the "query-response pair"—can be used to influence the behavior of the coaching platform 212. For example, the learning module 220 can add the query-response pair to the knowledge base maintained by the coaching platform 212 as a content card. Moreover, the learning module 220 can increase the sentences that lead to that content card. If all sentences leading to a given content card are referred to as a "cluster," the next time that a similar query is searched in hyperspace, the closest clusters may be different.

As an example, when a user selects a content card j for a given query q, the learning module 220 can add $t_j$ to T, add q to DT, and as a result, sentence_embedding(q) to C. In such a scenario, $T=\{t_1, \ldots, t_n, t_j\}$, $DT=\{t_1, \ldots, t_n, q\}$, and $C=\{c_1, \ldots, c_{n+1}\}$. Here, the dummy tiles are the ones that the coaching platform 212 may convert to vectors using sentence embeddings, though the coaching platform 212 may eventually send back content cards from T to the user. Given a new query that is similar to q in hyperspace, this time the content card previously selected by the user may have a mathematically higher chance to get selected.

Figure 3:
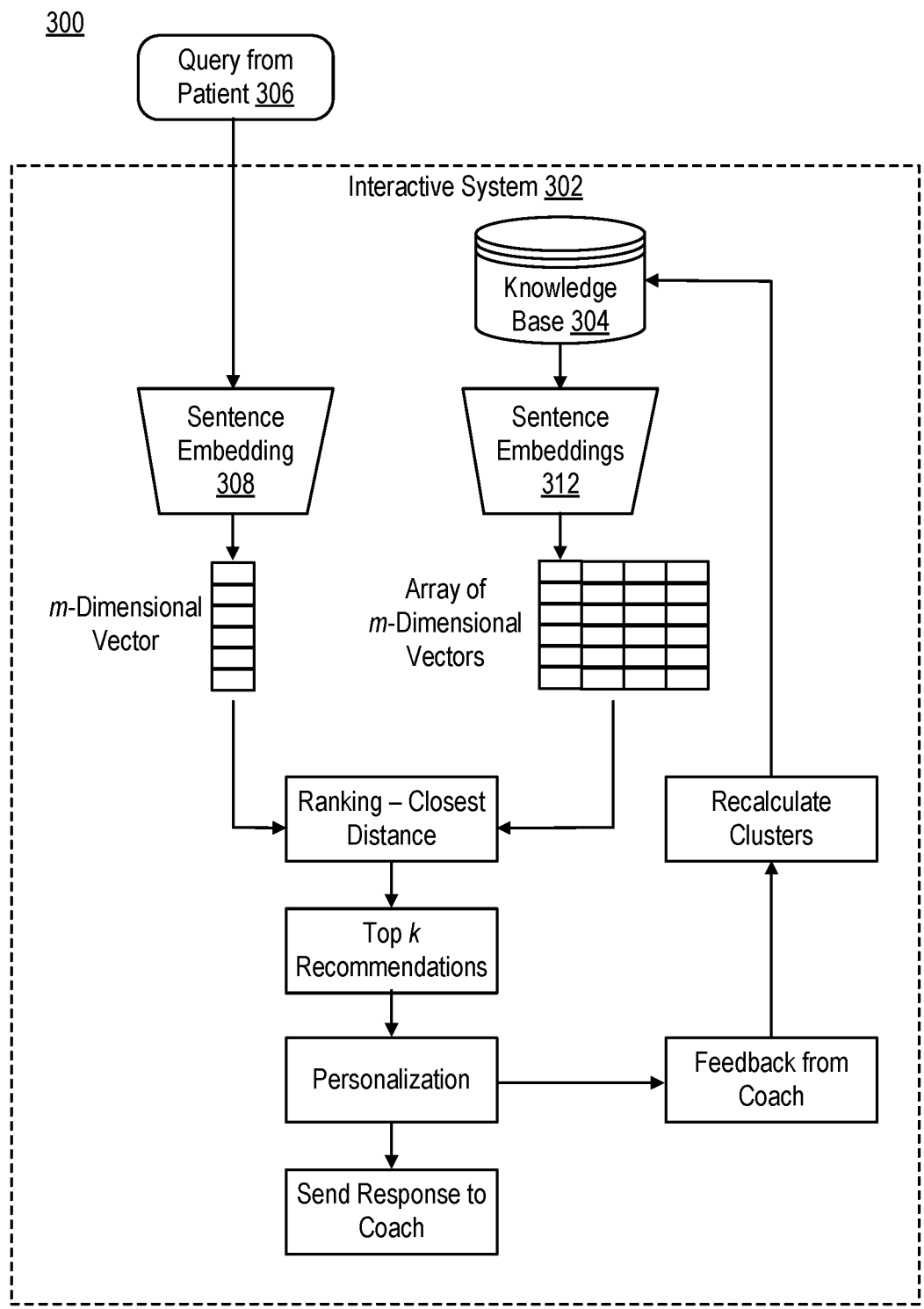
FIG. 3 includes a high-level illustration of a process for personalizing a knowledge base based on queries input by a user.

FIG. 3 includes a high-level illustration of a process 300 for personalizing a knowledge base 304 based on queries input by a user. As mentioned above, an interactive system 302 may maintain the knowledge base 304 for responding to questions posed by patients. The knowledge base 304 may contain predefined documentation in the form of content cards that can be used by coaches to more easily convey guidance for improving the health of the patients.

Assume, for example, that the interactive system 302 obtains input indicative of a query 306 that is associated with a patient. In some embodiments, the query 306 is representative of a question posed by the patient. For example, if the patient audibly utters the question, the query 306 may be representative of a textual representation of the question. In other embodiments, the query 306 directly corresponds to the question posed by the patient. For example, the patient may be prompted to specify her question via text, and the query 306 may be representative of that textual question as input by the patient.

In such a scenario, the interactive system 302 can produce a sentence embedding 308 (also called the "query embedding") for the query 306. At a high level, the query embedding 308 is an expressive representation of text that maps the query 306 onto a numerical vector 310 having m dimensions. Similarly, the interactive system 302 can produce sentence embeddings 312 (also called "base embeddings") for each content card in the knowledge base 304. These base embeddings 312 are expressive representations of text that map the content cards onto numerical vectors 314 having m dimensions. For convenience, these base embeddings 312 may be described as corresponding to content cards in the knowledge base 304 in a one-to-one mapping, namely, where each content card is associated with a single base embedding. However, multiple base embeddings may correspond to a single content card, or multiple content cards may correspond to a single base embedding. Thus, these base embeddings 312 may have a one-to-one mapping, one-to-many mapping, or many-to-one mapping to the content cards in the knowledge base 304.

By comparing the query embedding 308 to the base embeddings 312, the interactive system 302 can identify those base embeddings that are most similar to the query embedding 308. Said another way, the interactive system 302 can rank the base embeddings 312 based on how similar each base embedding is to the query embedding 308. In data science, measures indicative of similarity represent one way of measuring how close data are to one another. To measure similarity between two m-dimensional vectors $A=[a_1, a_2, \ldots, a_m]$ and $B=[b_1, b_2, \ldots, b_m]$, the interactive system 302 could utilize Euclidian distance measures, cosine measures, dot product measures, or some other type of distance measure. Regardless of type, distance measures (also called "similarity measures") are commonly expressed as a numerical value. For Euclidian distance measures, the numerical value decreases as similarity increases. For cosine measures and dot product measures, the numerical value increases as similarity increases. For convenience, similarity measures tend to be expressed within a range (e.g., 0 to 1, 0 to 10, 0 to 100). For each of the base embeddings 312, the interactive system 302 can compute, derive, or otherwise obtain a similarity measure that indicates similarity between that base embedding and the query embedding 308.

Thereafter, the interactive system 302 can identify the top k recommendations based on the similarity measures produced for the base embeddings 312. In some embodiments, the number of recommendations that are identified is predetermined. For example, the interactive system 302 may identify the top 2, 3, 5, or 10 content cards based on the similarity measures. In other embodiments, the number of recommendations that are identified is determined dynamically. For example, the interactive system 302 may employ a clustering algorithm that attempts to identify groupings by discovering more natural "breaks" in the similarity measures, and all content cards that fall within the most similar grouping may be identified as recommendations. The top k recommendations may be representative of a filtered set of base embeddings that is at least a subset of the base embeddings 312 and never a null set.

The interactive system 302 can then personalize the top k recommendations. Specifically, the interactive system 302 may select one of the top k recommendations to present to a coach that is responsible for helping the patient achieve better health. Selection may be based on characteristics of the coach or characteristics of the patient. Examples of patient characteristics include personal history (e.g., whether the user has historically adhered to a prescribed disease management program), medical history (e.g., disease, disease classification, disease progression), interests, and the like. Examples of coach characteristics include history of content card selections, content card preferences (e.g., in terms of tags, category, subcategory, etc.), and the like. In some embodiments, the selected recommendation is automatically sent to the patient on behalf of the coach by the interactive system 302. In other embodiments, the selected recommendation is presented to the coach for review, and the selected recommendation is sent to the patient in response to a determination that the coach has approved the selected recommendation.

Generally, the base embeddings 312 are dynamic, in the sense that the base embeddings 312 can be updated when changes are made to the knowledge base 304. Assume, for example, that the interactive system 302 receives input that is indicative of an update to the content cards in the knowledge 304. The update could be the addition of a new content card, for example, in response to the process further discussed below with reference to FIG. 4, the modification of an existing content card, or the deletion of an existing content card. In such a scenario, the interactive system 302 can reproduce the first set of embeddings so as to account for the update.

Note that, in some embodiments, the coach is able to provide feedback regarding either the selected recommendation or top k recommendations, as shown in FIG. 3. For example, the coach may be permitted to like or dislike content cards, for example, through a review process carried out through interfaces generated by the interactive system 302. As discussed above, the feedback provided by the coach can be used—on its own or in combination with feedback from other coaches—to influence how content cards are identified. For example, feedback could be used to adjust a weight assigned to the selected content card, thereby influencing the likelihood that the selected content card is selected in the future. Additionally or alternatively, the interactive system 302 may readjust or recalculate the "cluster" of queries that lead to the selected answer. Accordingly, the next time that a similar query is obtained by the interactive system 302 as input, the closest clusters may be different.

Figure 4:
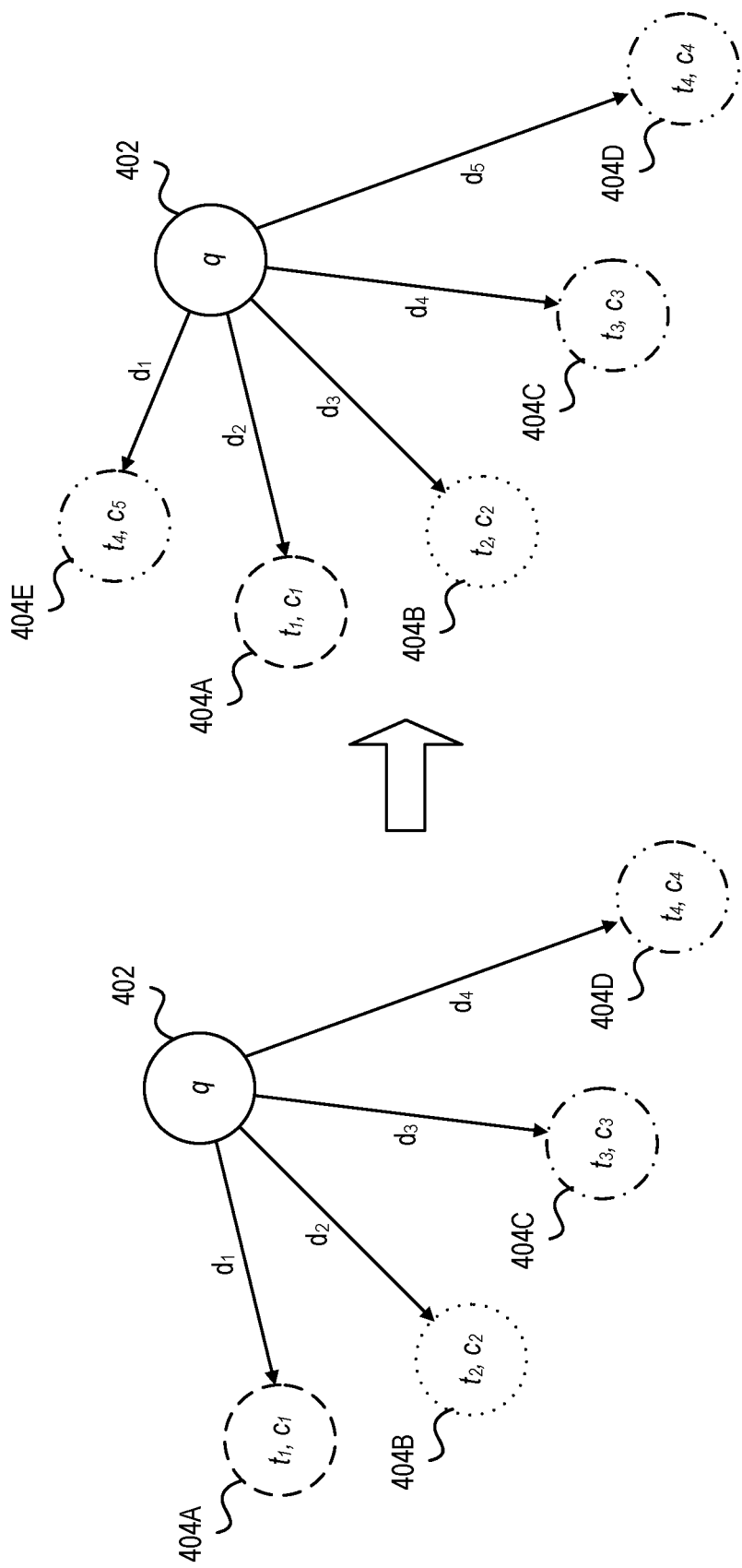
FIG. 4 includes a visualization where distance between a node representing a query (and more specifically, its embedding) and nodes representing the content cards is indicative of similarity.

As an illustrative example, consider a scenario where (i) there is no personalization, (ii) only four content cards are available, and (iii) the interactive system returns a single recommendation (i.e., k=1). FIG. 4 includes a visualization of such a scenario, where distance between a node 402 representing a query (and more specifically, its embedding) and nodes 404A-D representing the content cards is indicative of similarity. As can be seen in FIG. 4, the visualization suggests that content card $t_1$ as $c_1$ has the closest distance to the query embedding q. However, assume that the coach instead selects content card $t_4$ that has the longest distance to the query embedding q. This feedback can be learned by the interactive system. For example, a new pair of $t_4$, $c_5$ can be added to the knowledge base, where $c_5$ is equal to the query from which the query embedding q is calculated. In the future, for any queries that have a sentence embedding similar to $c_5$, the interactive system may recommend content card $t_4$ since that relationship has been learned through feedback.

Each of the nodes 404A-D represents a potential response to the query represented by node 402. The line type represents taxa that is different in syntax, but shares either similar content or different content associated with a similar treatment, diagnosis, or disease. As can be seen in FIG. 4, each of the nodes 404A-D (and more specifically, each of the corresponding content cards) has a different taxa than the query, as none of the nodes 404A-D have the same line type as node 402. Utilizing the aforementioned process, the interactive system can add nodes (here, node 404E) with the same taxa at a closer distance. Specifically, node 404E has the same taxa as node 404D but is closer in distance to node 402. Adding nodes at closer distances is one of the linking synergistic features that allows the interactive system to incorporate feedback in a meaningful, personalized way.

Utilizing the aforementioned process, the interactive system can improve its ability to select appropriate content cards over time, and with more labels a more robust selection scheme can be developed. The methodology employed by the interactive system may involve initially looking at the most similar content cards for sorting purposes. However, this might affect accuracy based on the amount of noise. To address this issue, the interactive system may employ a robust approach to making selections. One example of such an approach involves utilizing k-nearest neighbors ("kNN"), a classification scheme in which at least k neighbors from a given cluster must be within a predefined distance in order to add the given cluster into the ranking list. Another example of such an approach involves utilizing centroids of clusters rather than single datapoints in hyperspace. With the centroid-focused approach, the interactive system relies on centroids rather than individual datapoints, thereby lessening the impact of inaccurate datapoints.

Methodologies for Personalizing Knowledge Bases

FIG. 5 includes a flow diagram of a process 500 for personalizing a knowledge base that is used to facilitate conversations. Generally, the knowledge base is used to facilitate conversations in a semi-autonomous manner, for example, by allowing coaches to guide the conversations by selecting from among content cards recommended by the coaching platform. However, the knowledge base could be used to facilitate conversation in a fully autonomous manner, or the coaching platform may allow for switching between a semi-autonomous mode and autonomous mode.

Initially, the coaching platform may acquire first input that is indicative of a query from a first individual (step 501). This first individual may be presentative of a patient who is interested in seeking feedback from a coach for improving her health. Generally, the query is input—either textually or audibly—through a computer program executing on a computing device. For example, the patient may input the query via a mobile application executing on her mobile phone.

The coaching platform can then provide the query to a machine learning model, so as to produce an embedding that numerically represents the query in a language domain (step 502). As discussed above, the machine learning model may be representative of a language model, such as a BERT transformer model. Moreover, the coaching platform can provide entries in the knowledge base to the machine learning model, so as to produce embeddings that numerically represent the entries in the language domain (step 503). Each entry in the knowledge base may be representative of a content card that includes, for example, (i) a recommendation for improving health, (ii) an educational summary of a disease or a treatment, or (iii) a motivational statement. In some embodiments, only the titles of the entries—rather than the entries themselves—are provided to the machine learning model, and as such, the embeddings may be representative of the titles. Moreover, instead of being performed responsive to receiving inputs indicative of queries, step 503 could be performed at a single point in time (e.g., when the knowledge base is created or implemented).

The coaching platform can compare the embedding produced for the query against the embeddings produced for the entries in the knowledge base (step 504), and thereafter, identify multiple embeddings from among the embeddings produced for the entries that most closely correspond to the embedding produced for the query (step 505). Accordingly, the coaching platform can compare the embedding produced for the query against the embeddings produced for the entries, so as to identify the multiple embeddings that most closely correspond to the embedding produced for the query. As mentioned above, each of the entries may correspond to a different content card, and therefore each of the embeddings may correspond to a different content card. Generally, comparison is based on distance measures computed for the embeddings produced for the entries. For example, the coaching platform may calculate a set of distance measures by calculating a distance measure for each of the embeddings produced for the entries, populate the distance measures into a data structure, and sort the data structure such that the set of distance measures are in an ordered arrangement. The data structure may be representative of an array in which the number of entries corresponds to the number of entries in the knowledge base.

The coaching platform can then cause display of multiple content cards that are associated with the multiple embeddings identified as the most similar to the embedding produced for the query (step 506). Specifically, the coaching platform can cause digital presentation of pictorial, video, or audio content included in those multiple content cards on an interface that is accessible to a second individual. This second individual may be the coach that is responsible for providing feedback to the patient that submitted the query. Through the interface, the coach can select one of the multiple content cards. Accordingly, the coaching platform may acquire second input that is indicative of a selection of a content card from among the multiple content cards by the coach (step 507). Generally, the selection is input—either textually or audibly—through a computer program executing on a computing device. For example, the coach may input the selection via a mobile application executing on her mobile phone, much like how the patient inputs the query. As another example, the coach may input the selection via a web browser executing on her laptop computer.

The coaching platform can then add a new content card that programmatically associates the query with content included in the selected content card to the knowledge base (step 508). This ensures that the new content object can be automatically suggested for a future query that is identical or similar to the query. Like memoization, this approach to updating the knowledge base can serve as an optimization technique for searching for answers to queries in a faster, more resource-efficient manner, since coaches are less likely to spend significant amounts of time searching for appropriate content cards.

In this way, the coaching platform is not only able to account for preferences of coaches, but can also more rapidly expand to cover more possible queries from patients. Moreover, the coaching platform cause display of the content included in the new content card on another interface accessible to the patient (step 509). In some embodiments, the content is presented on the same interface through which the patient inputs the query. In other embodiments, the content is presented on a different interface than the one through which the patient inputs the query. Note that the content could also be presented via other mechanisms. Assume, for example, that the patient inputs the query through a mobile application on her mobile device. In such a scenario, the content could be presented to the patient in the form of a notification. Alternatively, the content could be presented to the patient in the form of a text message, an email message, or even a semi- of fully-automated voicemail.

Figure 6:
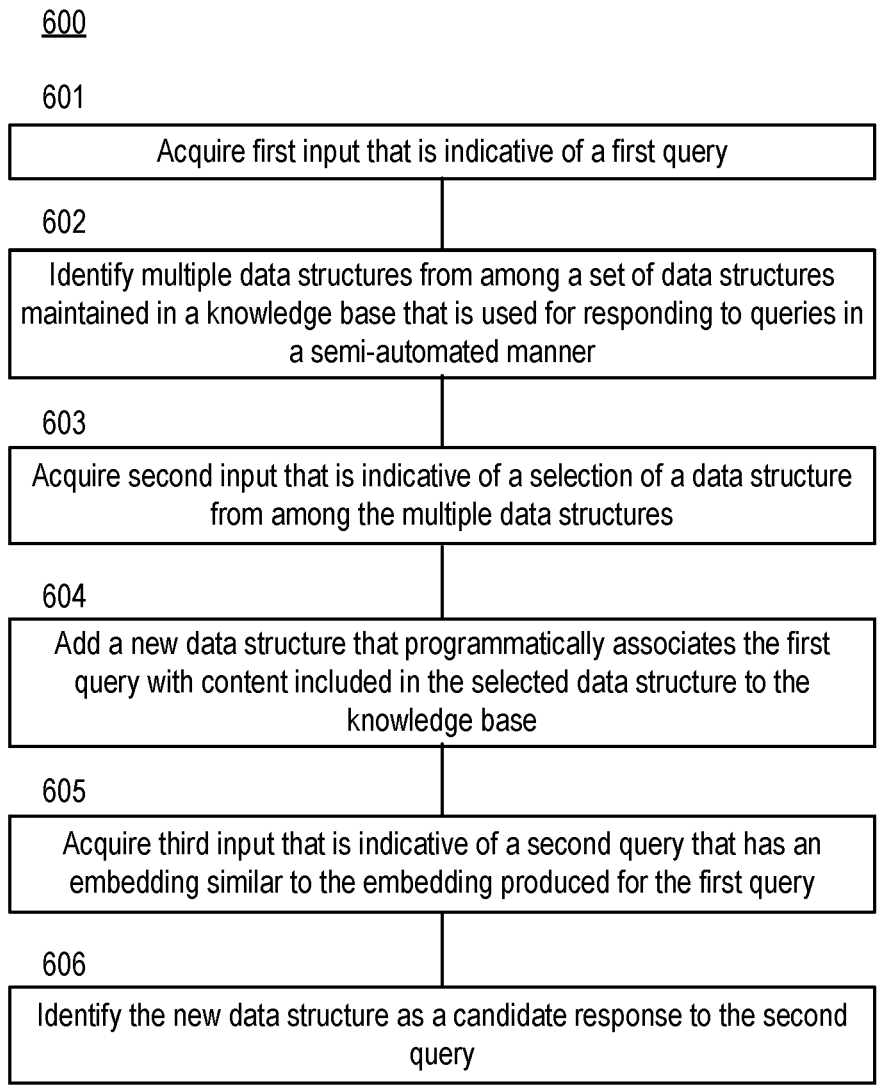
FIG. 6 includes a flow diagram of a process for expanding a knowledge base to account for feedback provided by a coach.

FIG. 6 includes a flow diagram of a process 600 for expanding a knowledge base to account for feedback provided by a coach. Initially, a coaching platform can acquire first input that is indicative of a query from a patient (step 601). As mentioned above, the patient may be able to input the query through a computer program executing on a computing device. Generally, the computer program allows for "freeform" responses, though the computer program may "guide" the patient through predetermined prompts or example responses.

Thereafter, the coaching platform can identify multiple data structures from among a set of data structures maintained in the knowledge base that is used for responding to queries in a semi-automated manner (step 602). Each data structure included in the set may be representative of a content card. Thus, each data structure included in the set can include content, for example, in the form of a recommendation, an educational summary, or a motivational statement. To identify the multiple data structures, the coaching platform may utilize embeddings as discussed above. For example, the coaching platform may compare an embedding produced for the query against a set of embeddings produced for the set of data structures, so as to generate a set of distance measures, populate the set of distance measures into an array that is sorted such that the set of distance measures are in an ordered arrangement, and then select the multiple data structures based on the ordered arrangement. Each distance measure in the set of distance measures may be indicative of similarity between the embedding produced for the query and a corresponding one of the set of embeddings produced for the set of data structures. Note that the number of data structures identified from among the set of data structures may be predetermined. For example, the coach may be able to specify the number of data structures (and therefore, the number of content cards) that are recommended by the coaching platform, though the coaching platform may recommend a certain number (e.g., 2, 3, or 5) by default.

Each of the multiple data structures may include content that is responsive or related to the query. Assume, for example, that the query is representable as a taxon that is syntax agnostic and represents a type or a category of the query. The multiple data structures identified by the coaching platform may be representable as taxa that are different in syntax but either (i) have shared content with each other or (ii) have different content but are associate with the same disease, diagnosis, or treatment. At a high level, the multiple data structures may correspond to different possible answers to the query, in the sense that the content included in the multiple data structures is responsive or relevant to the query.

The coaching platform can then acquire second input that is indicative of a selection of a data structure from among the multiple data structures (step 603). As mentioned above, the selection may be made by a coach through an interface on which the multiple data structures—or simply the content included therein—is presented for review. Thereafter, the coaching platform can add a new data structure that programmatically associates the query with content included in the selected data structure to the knowledge base (step 604).

Such an approach to expanding the knowledge base allows the coaching platform to respond to a broader range of queries in a more accurate manner. Assume, for example, that the coaching platform acquires third input that is indicative of another query that has an embedding similar to the embedding produced for the query (step 605). Because the coaching platform added the new data structure to the knowledge base, the coaching platform can identify the new data structure as a candidate response to this other query (step 606).

Unless contrary to physical possibility, it is envisioned that the steps described above may be performed in various sequences and combinations. For example, the processes could be performed as queries as submitted, such that the knowledge base is dynamically updated in real time. As another example, the processes could be performed on a periodic basis, such that the knowledge base is periodically updated. Steps could be added to, or removed from, the processes described above.

Other steps may also be included in some embodiments. As mentioned above, the coaching platform may produce embeddings for entries in the knowledge base that are representative of content cards irrespective of whether a query has been submitted. Thus, step 503 of FIG. 5 could be performed well before steps 501-502 of FIG. 5. Embeddings created for the entries could be stored in the knowledge base, or embeddings created for the entries could be stored in another storage medium.

Processing System

Figure 7:
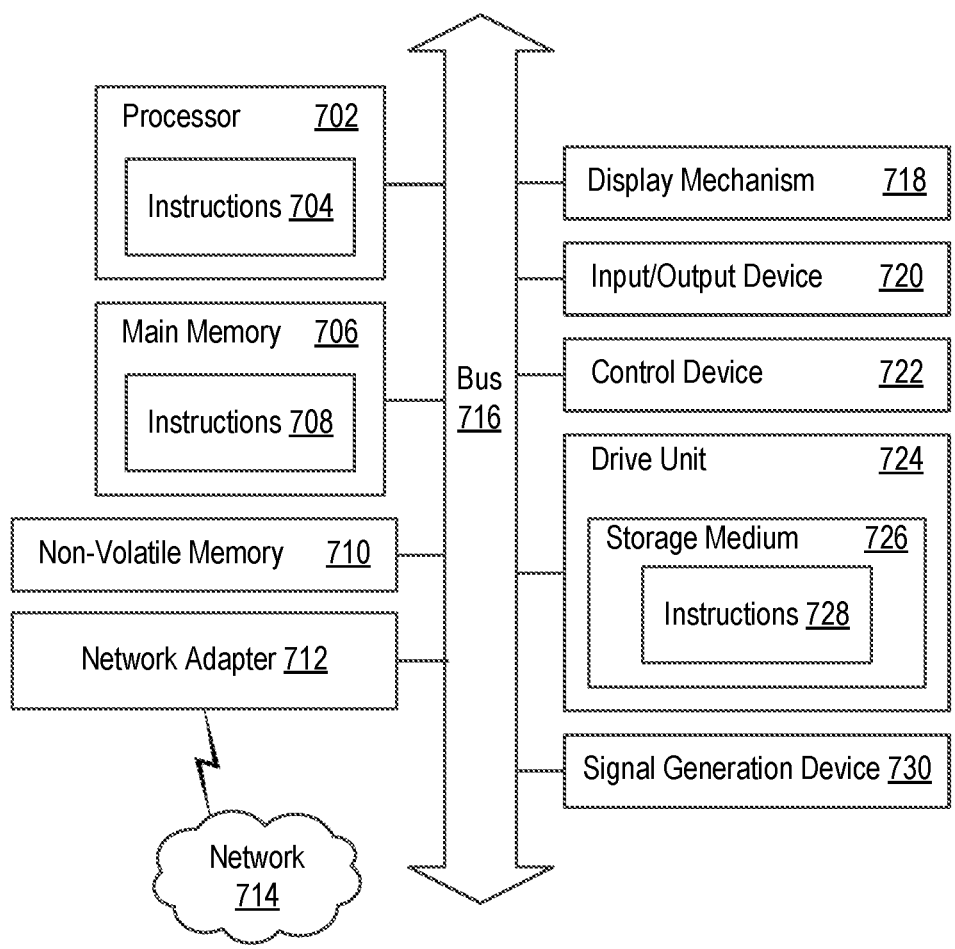
FIG. 7 is a block diagram illustrating an example of a processing system that can perform at least some operations described herein.

FIG. 7 is a block diagram illustrating an example of a processing system 700 that can perform at least some operations described herein. For example, some components of the processing system 700 may be hosted on a computing device that includes a coaching platform (e.g., coaching platform 102 of FIG. 1 or coaching platform 212 of FIG. 2).

The processing system 700 may include a processor 702, main memory 706, non-volatile memory 710, network adapter 712, video display 718, input/output device 720, control device 722 (e.g., a keyboard or pointing device), drive unit 724 including a storage medium 726, and signal generation device 730 that are communicatively connected to a bus 716. The bus 716 is illustrated as an abstraction that represents one or more physical buses or point-to-point connections that are connected by appropriate bridges, adapters, or controllers. The bus 716, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit ($I^2C$) bus, or an Institute of Electrical and Electronics Engineers (IEEE) standard 1394 bus (also referred to as "Firewire").

While the main memory 706, non-volatile memory 710, and storage medium 726 are shown to be a single medium, the terms "machine-readable medium" and "storage medium" should be taken to include a single medium or multiple media (e.g., a centralized/distributed database and/or associated caches and servers) that store one or more sets of instructions 728. The terms "machine-readable medium" and "storage medium" shall also be taken to include any medium that is capable of storing, encoding, or carrying a set of instructions for execution by the processing system 700.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in a computing device. When read and executed by the processors 702, the instruction(s) cause the processing system 700 to perform operations to execute elements involving the various aspects of the present disclosure.

Further examples of machine- and computer-readable media include recordable-type media, such as volatile memory devices and non-volatile memory devices 710, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 712 enables the processing system 700 to mediate data in a network 714 with an entity that is external to the processing system 700 through any communication protocol supported by the processing system 700 and the external entity. The network adapter 712 can include a network adaptor card, a wireless network interface card, a router, an access point, a wireless router, a switch, a multi-layer switch, a protocol converter, a gateway, a bridge, bridge router, a hub, a digital media receiver, a repeater, or any combination thereof.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a processor of a computing device, the method comprising:
    acquiring, via a device-implemented member console, first input that is indicative of a query from a first individual;
    providing the query to a transformer model, so as to produce a query-associated embedding that represents an enumeration of the query in a language domain;
    comparing the query-associated embedding against a first set of embeddings associated with a first set of content objects included in a knowledge base that is used for responding to queries, the first set of content objects comprising health-related media,
        wherein each embedding in the first set of embeddings is associated with a corresponding one of the first set of content objects;
    identifying, based on an outcome of said comparing, a second set of embeddings from among the first set of embeddings that most closely correspond to the query-associated embedding;
    causing digital presentation of a second set of content objects that are associated with the second set of embeddings on a device-implemented coach console accessible to a second individual;
    acquiring, via the device-implemented coach console, second input that is indicative of a selection of a content object from among the second set of content objects by the second individual; and
    adding a new content object that is programmatically linked to the query-associated embedding to the knowledge base, the new content object including content included in the selected content object, such that the new content object can be automatically suggested for a future query that is identical or similar to the query.

2. The method of claim 1, wherein the second set is at least a subset of the first set and never a null set.

3. The method of claim 1, wherein said comparing comprises:
    calculating a set of distance measures by calculating a distance measure for each embedding in the first set of embeddings,
    populating the set of distance measures into a data structure, and sorting the data structure such that the set of distance measures are in an ordered arrangement.

4. The method of claim 3, wherein the data structure is an array in which a number of entries corresponds to a number of embeddings in the first set of embeddings.

5. The method of claim 3, wherein the distance measure is a Euclidian distance measure, a cosine distance measure, or a dot product distance measure.

6. The method of claim 1, wherein the second individual is responsible for guiding the first individual toward a healthier state.

7. The method of claim 1, further comprising:
causing digital presentation of the new content object on another interface accessible to the first individual.

8. The method of claim 1, wherein the content is representative of (i) a recommendation, (ii) an educational summary, or (iii) a motivational statement.

9. The method of claim 1, further comprising:
receiving third input that is indicative of an update to the first set of content objects included in the knowledge base; and
reproducing the first set of embeddings so as to account for the update.

10. A non-transitory medium with instructions stored thereon that, when executed by a processor of a computing device, cause the computing device to perform operations comprising:
acquiring first input that is indicative of a query;
identifying multiple data structures from among a set of data structures maintained in a knowledge base that is used for responding to queries in a semi-automated manner, wherein each data structure of the multiple data structures includes health-related media content that is responsive or related to the query;
acquiring second input that is indicative of a selection of a data structure from among the multiple data structures; and
adding a new data structure that is programmatically linked to the embedding produced for the query programmatically associates the query with and that includes content included in the selected data structure to the knowledge base.

11. The non-transitory medium of claim 10, wherein the query is representable as a taxon that is syntax agnostic and represents a type or a category of the query.

12. The non-transitory medium of claim 11, wherein the multiple data structures are representable as taxa that are different in syntax but either (i) have shared content or (ii) have different content but are associated with a same disease, a same diagnosis, or a same treatment.

13. The non-transitory medium of claim 10, wherein the operations further comprise:
providing the first input to a model, so as to produce an embedding that numerically represents the query.

14. The non-transitory medium of claim 13, wherein said identifying comprises:
comparing the embedding against a set of embeddings produced for the set of data structures, so as to generate a set of distance measures,
wherein each distance measure in the set of distance measures is indicative of similarity between the embedding and a corresponding one of the set of embeddings,
populating the set of distance measures into an array,
sorting the array such that the set of distance measures are in an ordered arrangement, and
selecting the multiple data structures based on the ordered arrangement.

15. The non-transitory medium of claim 13, wherein the operations further comprise:
acquiring third input that is indicative of another query that has an embedding similar to the embedding produced by the model for the query; and
identifying the new data structure as a candidate response to the other query.

16. The non-transitory medium of claim 15, wherein the operations further comprise:
causing display of the content on an interface that is accessible to an individual that submitted the other query.

17. The non-transitory medium of claim 15, wherein the operations further comprise:
causing display of the content on an interface that is accessible to an individual that is responsible for guiding another individual that submitted the other query toward a healthier state.

18. The non-transitory medium of claim 10, wherein a number of data structures identified from among the set of data structures is predetermined.

19. The non-transitory medium of claim 18, wherein the number of data structures is specified by an individual to whom the multiple data structures are presented for review and from whom the second input is acquired.

20. A method for personalizing a knowledge base used to facilitate conversations, the method comprising:
acquiring first input that is indicative of a query from a first individual;
comparing an embedding produced for the query against embeddings produced for entries in the knowledge base, so as to identify multiple embeddings that most closely correspond to the embedding,
wherein each of the embeddings is associated with a corresponding one of the entries that includes (i) a recommendation to be implemented by the first individual for improving health of the first individual, (ii) an educational summary of a disease or a treatment of the first individual, or (iii) a motivational statement to the first individual;
identifying multiple entries in the knowledge base that are associated with the multiple embeddings;
causing presentation of content included in the multiple entries on an interface accessible to a second individual;
acquiring second input that is indicative of a selection of an entry from among the multiple entries by the second individual; and
adding a new entry that s programmatically linked to the embedding produced for the query and that includes content included in the selected entry to the knowledge base, such that the new entry can be automatically suggested for a future query that is identical or similar to the query.

21. The method of claim 20, further comprising:
providing the query to a Bidirectional Encoder Representations from Transformers (BERT) transformer model, so as to produce the embedding; and
providing content included in the entries to the BERT transformer model, so as to produce the embeddings.

22. The method of claim 20, wherein the embeddings produced for the entries in the knowledge base are based on titles assigned to the entries.

* * * * *